(12) United States Patent  
Wieser

(10) Patent No.: US 12,504,385 B2  
(45) Date of Patent: Dec. 23, 2025

(54) INSPECTION SYSTEM AND METHOD FOR ANALYZING FAULTS

(71) Applicant: WICKON HIGHTECH GMBH, Landau (DE)

(72) Inventor: Roman Wieser, Landau / Isar (DE)

(73) Assignee: Wickon Hightech GmbH, Landau (DE)

( * ) Notice: Subject to any disclaimer, the term of this patent is extended or adjusted under 35 U.S.C. 154(b) by 111 days.

(21) Appl. No.: 18/693,985

(22) PCT Filed: Sep. 21, 2022

(86) PCT No.: PCT/EP2022/076257  
§ 371 (c)(1),  
(2) Date: Mar. 21, 2024

(87) PCT Pub. No.: WO2023/046769  
PCT Pub. Date: Mar. 30, 2023

(65) Prior Publication Data  
US 2024/0385125 A1 Nov. 21, 2024

(30) Foreign Application Priority Data  
Sep. 22, 2021 (DE) ..................... 10 2021 124 504.4

(51) Int. Cl.  
*G01N 21/956* (2006.01)  
*G01N 21/88* (2006.01)

(52) U.S. Cl.  
CPC ....... *G01N 21/956* (2013.01); *G01N 21/8806* (2013.01); *G01N 2021/8845* (2013.01); *G01N 2021/95638* (2013.01)

(58) Field of Classification Search  
CPC ............ G01N 21/956; G01N 21/8806; G01N 2021/8845; G01N 2021/95638;  
(Continued)

(56) References Cited

U.S. PATENT DOCUMENTS

2009/0309022 A1* 12/2009 Gunji ................. H01J 37/28  
250/311

FOREIGN PATENT DOCUMENTS

CN 207556477 U 6/2018  
DE 697 34 010 T2 6/2006  
(Continued)

*Primary Examiner* — Abdullahi Nur  
(74) *Attorney, Agent, or Firm* — Dickinson Wright PLLC

(57) ABSTRACT

The invention relates to an inspection system (26) for analyzing defects in a product, the inspection system (26) comprising a projection device (32), an optical detection device (28) and a processing device, the projection device having a spectrometer member configured to split white light into its spectral components and project a multichromatic light beam (37) formed from monochromatic light beams onto a product, a detection unit (29) comprising an area scan camera (27) and an objective (28) being configured to detect the light beam (37) reflected on the product in a detection plane (46) perpendicular, preferably orthogonal, to a product surface (38) of the product. The detection unit has a dispersive or diffractive element (31) configured to project the reflected light beam onto an image plane (49) of the area scan camera, the processing device being configured to derive a height information of the product surface from a spatial distribution of saturation values of the reflected light beam in the image plane, a correction device being configured to correct a longitudinal chromatic aberration of the reflected light beam in the image plane.

19 Claims, 1 Drawing Sheet

(58) Field of Classification Search
CPC ........... G01N 21/9515; G01N 21/8851; G01N 21/9501; G01B 11/0608
See application file for complete search history.

(56) References Cited

FOREIGN PATENT DOCUMENTS

| | | |
|---|---|---|
| EP | 0950168 B1 | 8/2005 |
| EP | 2 307 852 B1 | 9/2012 |
| EP | 2720013 A2 | 4/2014 |
| JP | 2009-222616 A | 10/2009 |
| WO | 2002082009 A1 | 10/2002 |

\* cited by examiner

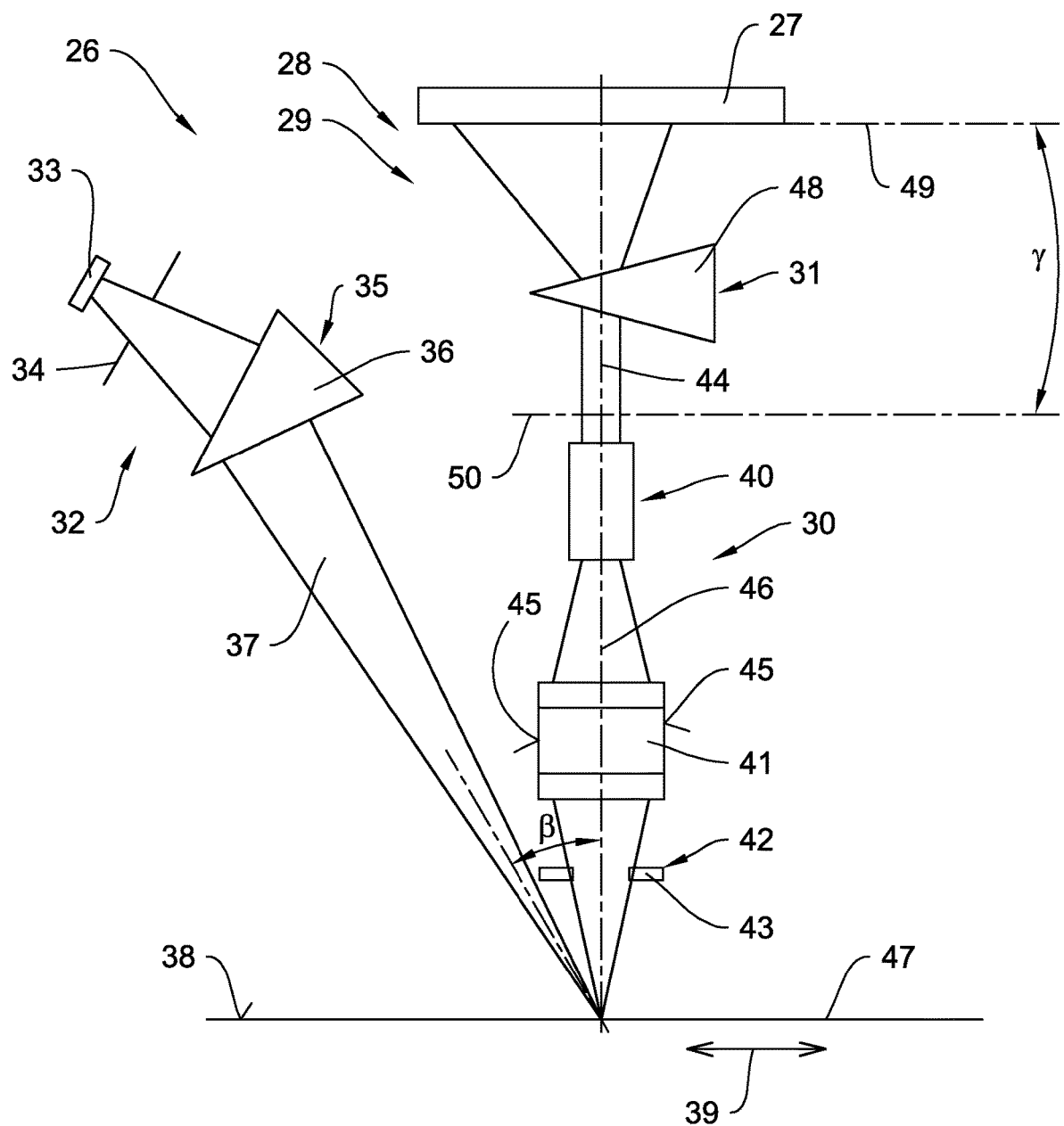

INSPECTION SYSTEM AND METHOD FOR ANALYZING FAULTS

This application is a national stage of International Application No. PCT/EP2022/076257, filed Sep. 21, 2022, which claims priority to German Patent Application No. 10 2021 124 504.4, filed Sep. 22, 2021 and entitled INSPECTION SYSTEM AND METHOD FOR ANALYZING FAULTS. Both of the aforementioned applications are incorporated by reference in their entireties.

The invention relates to an inspection system and to a method for analyzing defects in a product, in particular a printed circuit board product, a semiconductor wafer or the like, the inspection system comprising a projection device, an optical detection device and a processing device, the projection device having at least one spectrometer member configured to split white light into its spectral components and project a multichromatic light beam thus formed from monochromatic light beams onto a product at an angle of incidence $\beta$, the optical detection device having a detection unit comprising an area scan camera and an objective, the area scan camera being configured to detect the multichromatic light beam reflected on the product in a detection plane of the detection unit, the detection plane being perpendicular, preferably orthogonal, to a product surface of the product.

In the case of known inspection systems or methods for analyzing defects in a product, a height profile, for example of a printed circuit board or of components disposed on a printed circuit board, can be determined by means of a spectroscopic method. The product to be inspected may be what is known as a PCB (printed circuit board) or a photovoltaic cell. PCBs can be formed, for example, by printing a conductive paste onto a printed circuit board substrate to form conductive tracks or electronic components, such as resistors. Various materials, such as copper, gold, aluminum, titanium, etc., can be applied to the substrate. The printed circuit board product may further be fitted with wired components or what is referred to as SMD components, coated with solder resist and soldered as part of the manufacturing process in question, for example by wave soldering. In these manufacturing processes, a number of defects can occur, such as an incompletely printed conductor track, a defective solder joint or a missing component, which can lead to the printed circuit board product being unable to function. It is therefore regularly necessary for the printed circuit board product to be analyzed for possible defects during its manufacture.

Such a defect analysis is regularly carried out using an inspection system that has a camera for capturing images of the printed circuit board product. The camera may be what is referred to as a line scan camera, which has optical sensors disposed in a line or row or three rows or lines each having different sensors (RGB sensors), or an area scan camera having more than three rows or lines. A disadvantage of the known inspection systems is that the inspection system is able to analyze products with sufficient image quality only up to a certain size, as the line or row length of the optical sensors of the known cameras is limited due to the manufacturing process. For defect analysis, it may therefore be necessary to scan a product in several passes in order to capture the entire product surface or its relevant sections.

EP 2 307 852 B1 describes an inspection system and a method for analyzing defects in PCBs that can be used to optically measure a PCB surface. A polychromatic light beam emanating from a white light source is passed through a prism to generate a multichromatic light beam which is projected onto the printed circuit board product at an angle of incidence. Depending on a difference in height of a surface of the printed circuit board product, the surface appears, as a function of its height, in a spectral color of the multichromatic light beam directed at this height. A monochromatic light beam reflected from the surface in question in this manner is detected by means of an optical detection device, in particular a line scan camera, or a line of an area scan camera. By means of a processing device or a device for data processing, height information of the relevant surface of the printed circuit board product can then be calculated by setting the desired angle of incidence for directing the multichromatic light beam at the detection plane and setting the position of the printed circuit board product relative to the line scan camera.

A disadvantage of the inspection system or method described above is that a surface of the PCB cannot always be reliably detected. Depending on the reflectance or the color of the product surface, there may be deviations in a reflection of the relevant light beam on the product surface. For a reliable defect analysis, multiple images of the printed circuit board product or the PCB are therefore regularly required, or the product is illuminated with differently colored light, or the RGB channels that appear most suitable for a defect analysis are processed further using the processing device. To create a height profile and to obtain a good-quality analysis image of the product, however, different illumination devices, each with associated detection units, are regularly required, which can then scan the product surface sequentially or in separate passes. This makes the defect analysis itself and the constructive design of the inspection system complex. Another disadvantage is that the height information obtained for the surface in question may be inaccurate. Depending on the height of the surface, there may be blurring in an image plane of the optical detection device or on the line scan camera or the area scan camera. This makes a height measurement less accurate, and this blurring cannot be compensated for by using a camera chip with a higher resolution.

The object of the present invention is to propose an inspection system and a method for analyzing defects in a product that enable a reliable defect analysis by simple means.

This object is attained by an inspection system having the features of claim 1 and a method having the features of claim 13.

The inspection system according to the invention for analyzing defects in a product, in particular a printed circuit board product, a semiconductor wafer or the like, comprises a projection device, an optical detection device and a processing device, the projection device having at least one spectrometer member configured to split white light into its spectral components and project a multichromatic light beam thus formed from monochromatic light beams onto a product at an angle of incidence, the optical detection device having a detection unit comprising an area scan camera and an objective, the area scan camera being configured to detect a multichromatic light beam reflected on the product in a detection plane of the detection unit, the detection plane being perpendicular, preferably orthogonal, to a product surface of the product, wherein the detection unit has a dispersive or diffractive element configured to project the reflected multi-chromatic light beam onto an image plane of the area scan camera, the processing device being configured to derive a height information of the product surface from a spatial distribution of saturation values of the reflected multichromatic light beam in the image plane, a position of the optical detection unit relative to the product and the angle of incidence β, the detection unit having a correction device, the correction device being configured to correct a longitudinal chromatic aberration of the reflected multichromatic light beam in the image plane.

Depending on a difference in height of a product surface, a reflection image of the multichromatic light beam on the product surface shifts relative to an optical axis of the objective or to the detection plane of the detection unit or the area scan camera due to the multichromatic light beam directed at the detection plane at the angle of incidence β, the wavelength of the multichromatic light beam varying with a height in the detection plane. As a result, the reflection image in question is projected into the image plane of the area scan camera at an offset relative to the optical axis or the detection plane as a function of the wavelength or the height, as well. By determining a location of the image in the image plane, it is then possible for the processing device to calculate the height information of the product surface.

Since the multichromatic light beam, which is formed from monochromatic light beams, is projected onto the image plane of the detection device or the area scan camera via the dispersive or diffractive element, a length offset of the monochromatic light beam in question can result as a function of the wavelength of the monochromatic light beam, which represents the height information of an object surface: said length offset may lead to blurring in the image plane for this light beam. The correction device is configured to optically correct this longitudinal chromatic aberration of the multichromatic light beam or the monochromatic components in question for the image plane. This makes it possible to always obtain an essentially sharp image in the image plane and thus clearer and more accurate height information regardless of a height information or a wavelength of the monochromatic light beam projected onto the image plane. A resolution of a height can thus be significantly improved.

Furthermore, line images may be captured with above-average saturation values by at least two sensor lines of the area scan camera using the processing device. A shift of the reflection image in the image plane is then determined by evaluating a spatial distribution or an apparent width of saturation values using the processing device. The location of the shift is determined from the spatial distribution or the apparent width of the saturation values, as the sensor lines of the area scan camera with the above-average saturation values represent the same. It is therefore sufficient to determine no more than two sensor lines with above-average saturation values using the processing device and to capture the line images imaged on these sensor lines in the image plane. This not only makes it possible to determine the height or a topography but also to capture line images of the product surface at the same time. By using the dispersive or diffractive element, which is positioned directly in front of the area scan camera or between the area scan camera and the objective, line images in different color gradations are obtained.

The image plane of the area scan camera may be inclined by an angle γ≠0° relative to a main plane of the objective in such a manner that the image plane is adapted to the longitudinal chromatic aberration of the reflected multichromatic light beam. The correction device can therefore already be formed by the fact that the image plane of the area scan camera is inclined relative to the main plane of the objective. The image plane and the main plane are then no longer disposed parallel to each other. In principle, the image plane is then also inclined relative to an optical axis of the detection device or of the objective. This inclination allows the longitudinal color error that would otherwise occur to be corrected in such a manner that a comparatively sharp image is always formed regardless of the wavelength of the respective monochromatic light beams projected onto the image plane.

Alternatively, the correction device may be formed by a further optical element, which is disposed in the beam path between the objective and the area scan camera. As a single alternative or an addition to the inclination of the area scan camera, a further optical element may be disposed in the beam path between the objective and the area scan camera in such a manner that the longitudinal color error in question is corrected accordingly. The additional optical element may be an appropriately adapted achromatic lens, a prism or the like.

The processing device can be used to derive an analysis image of the product from a plurality of line images. The processing device can then combine the captured line images in the course of a scanning process to form an analysis image of the product surface. In particular, height information and a high-quality analysis image can be obtained simultaneously in a single scan of the product surface.

By means of the objective, a line image can be projected from an object plane of the product surface onto an image plane of the area scan camera: the area scan camera May be disposed transversely, preferably orthogonally, to a direction of movement of a product. For example, the area scan camera may have a rectangular sensor surface, allowing a detection width in relation to a product surface to be optimally utilized. In this case, the objective serves to project a line image which corresponds to a multichromatic light beam reflected on the product and which can be captured by the objective into the image plane of the area scan camera. Due to the dispersive element disposed between the objective and the area scan camera, a beam path is divergent and the projection into the image plane is spectrally distributed across the image plane according to the spectrum of the spectrometer member and the multichromatic light beam reflected on the product due to the refraction of the dispersive element.

The area scan camera may be formed by an RGB chip or a grayscale chip which has 32 to 128 sensor lines, preferably 32 to 64 sensor lines, transverse, preferably orthogonal, to a direction of movement of a product. For example, the area scan camera may have 1024 pixels×36 sensor lines, 2048 pixels×72 sensor lines, 4096 pixels×128 sensor lines, 16,384 pixels×256 sensor lines or more. In principle, a higher resolution can be achieved with a grayscale chip, as all sensor lines of the grayscale chip can be used regardless of a wavelength of the light. Nevertheless, it is also possible to use an RGB chip.

The projection device may emit light in the red, green, blue (RGB), infrared (IR) and/or ultraviolet (UV) wavelength ranges, preferably in a wavelength range of 400 to 700 nm, and the area scan camera can detect this light.

The dispersive or diffractive element may be a prism or a diffraction grating. In a particularly simple embodiment, the prism may be a dispersion prism in the form of an isosceles triangle, for example.

The objective may be a telecentric objective with a diaphragm on the image side. The beam path of the objective may then run at least partially parallel within the objective. The diaphragm or aperture diaphragm may be disposed in a focal plane of the objective on the objective side. Consequently, the objective may also be a partially telecentric objective.

The diaphragm may be a slit diaphragm. Since an area scan camera is used, it is sufficient if the diaphragm is a slit diaphragm that is disposed or aligned in the direction of the longitudinal axis of the area scan camera.

The objective may have a front lens that is formed by a converging lens and/or by an achromatic lens. The achromatic lens may be composed of at least two lenses, the lenses of the achromatic lens being glued together or merely placed one inside the other, with a very thin air gap being formed. The air gap between the lenses may be up to 100 µm, for example. This makes it possible to form an achromatic lens particularly cost-effectively and to dispense with gluing the lenses together. The use of an achromatic lens makes it possible to correct color errors or distortion errors.

The front lens may be a cylindrical or spherical lens. It may be sufficient to use a cylindrical lens alone as the front lens, as only a light slit in the image plane or the line image needs to be imaged. By using the cylindrical lens, it is possible to save costs in the manufacture of the inspection system.

The front lens may be in the shape of a circle segment with two coaxial and parallel boundary surfaces. If the front lens is a cylindrical lens, the edges of the front lens may be cut off so that a rod-shaped lens which includes a main axis of the cylindrical lens remains. If the front lens is a spherical lens, boundary surfaces at the outer ends of the front lens may also be parallel, in which case the front lens may only approximately correspond to a circle segment. Using a rod-shaped front lens configured in this manner, it is possible to save installation space next to the detection unit compared to a completely circular front lens and then use this installation space for placing the projection device or an illumination device. The inspection system becomes particularly compact in this case.

A circle segment of the front lens may have a depth of <20 mm, preferably 10 mm, and the front lens may have a width of >250 mm, preferably 180 mm. The width of the front lens may also be understood as a diameter of the front lens. The depth of the front lens may correspond to a relative distance between the parallel boundary surfaces.

The optical detection device may have at least one second detection unit with a second area scan camera, a second dispersive or diffractive element and a second objective, and the area scan cameras may be disposed in alignment relative to one another in the direction of their longitudinal axes. The area scan cameras may be disposed in such a manner at a distance relative to one another that the respective line images of the area scan cameras which may be captured from the object plane by the area scan cameras in a common detection plane may partially overlap, the processing device being configured to assemble or combine the overlapping line images into a combination line image, the processing device being configured to derive an analysis image of the product from a plurality of combination line images.

The second detection unit of the optical detection device may be disposed in such a manner with the second area scan camera and the second objective that the area scan cameras are positioned in a row with respect to their longitudinal axes and thus transversely to the direction of movement. The area scan cameras may be disposed at a distance relative to each other but adjacent to each other. The line images in the object plane are comparatively larger than the line images in the image plane of the area scan camera, which makes it possible to arrange the detection units or area scan cameras in such a manner that the respective line images of the area scan cameras partially overlap at their longitudinal ends, i.e., that the area scan cameras can each capture matching sections (b) of the product surface. The processing device may be configured in such a manner that it can assemble or combine these overlapping line images into a combination line image. This makes it possible in principle to form an inspection system with an almost arbitrarily large detection width (E) by forming a row of area scan cameras or detection units. A total width of a product may then be captured in one scan pass, and the combination line images may be combined to form the analysis image of the product using the processing device.

The combination line image may have a detection width (E) in the object plane that is greater than a detectable width (B) of the line image in the object plane. Consequently, the respective line images do not overlap completely but only in an overlapping section (b). For example, the overlapping section may be 1 mm to 3 mm in size.

A detectable width (B) of the line image in the object plane may be greater than a diameter (D) of the objective or a length (L) of the area scan camera. This makes it possible to arrange area scan cameras with aligned longitudinal axes next to each other and still obtain an undivided combination line image in the first place. The diameter of the objective is understood to be a maximum external dimension of the objective, and the length of the area scan camera is understood to be a maximum external length of the area scan camera.

An optical axis of the objective may be disposed orthogonally relative to the object plane and transversally to the direction of movement, and a convergent beam path of the objective may run at an angle α>80° and <90° relative to the object plane. The convergent beam path of the objective makes it possible to partially overlap the line images of the object plane and at the same time to arrange the detection units next to each other, possibly with a space in between. The optical axes of the respective objec-tives may then be disposed in parallel in the detection plane.

It is particularly advantageous if the line images overlap by 1 mm to 3 mm. In this case, the processing device may be configured to combine the line images to form the combination line image based on matching pixels in the overlapping areas. By adding the line images in the overlap area, it is possible to achieve a particularly good image quality in the overlap area. The objective may then also have imaging errors in the edge area of its detectable width, which may then be tolerated.

The projection device may have an illumination device, and the illumination device may be configured to project diffuse light onto the product, and the area scan camera may be configured to detect light of the diffuse light reflected on the product in the detection plane. The illumination device may have a diffuser, by means of which a homogeneous distribution of the light on the product surface may be achieved while avoiding strong contrasts. The illumination device may emit light in the red, green and blue (RGB), infrared (IR) and/or ultraviolet (UV) wavelength ranges. Also, color components of the light may be selectable as desired in order to mix certain wavelength ranges. The illumination device may be composed of a number of light-emitting diodes (LEDs) disposed in rows or a matrix. Also, the illumination device may have a polarization filter.

The projection device may have a second illumination device, and the first and second illumination devices may be disposed coaxially relative to the optical detection device. The illumination devices may also be disposed transversely or orthogonally to the direction of movement of the product. This avoids a possible formation of shadows on the product surface. The structure of the second illumination device may correspond to that of the first illumination device.

In the method according to the invention for analyzing defects in a product, in particular a printed circuit board product, a semiconductor wafer or the like, using an inspection system comprising a projection device, an optical detection device and a processing device, a spectrometer member of the projection device splits white light into its spectral components by means of and projects a multichromatic light beam thus formed from monochromatic light beams onto a product at an angle of incidence β, the optical detection device having a detection unit comprising an area scan camera and an objective, a multichromatic light beam being reflected on the product in a detection plane of the detection unit, the detection plane being perpendicular, preferably orthogonal, to a product surface of the product, the area scan camera detecting said multichromatic light beam, wherein a dispersive or diffractive element of the detection unit projects the reflected multichromatic light beam onto an image plane of the area scan camera, the processing device deriving a height information of the product surface from a spatial distribution of saturation values of the reflected multi-chromatic light beam in the image plane, a position of the optical detection unit relative to the product and the angle of incidence β, a correction device of the detection unit a longitudinal chromatic aberration of the reflected multi-chromatic light beam in the image plane. With regard to the advantageous effects of the method according to the invention, reference is made to the description of advantages of the inspection system according to the invention.

By means of the processing device, at least three, preferably five, sensor lines of the area scan camera with the highest saturation values may simultaneously capture line images. For example, it is then also possible to superimpose at least two of the sensor lines or their line images in order to obtain a single quality-optimized line image. At the same time, an amount of data to be processed will also be small, which enables fast processing of the image data and therefore a fast scan of the product. By superimposing the line images, it will be possible to capture only one line image of the reflected multichromatic light beam with the area scan camera. The area scan camera is therefore used simultaneously for determining the topography and for selecting usable line images.

Line images in the red, green and blue (RGB) wavelength ranges may be captured simultaneously. This is made possible in particular by the use of the area scan camera. The processing device may also be used to analyze the image information or RGB color information separately according to hue (H), saturation(S) and value (V) in a color space (HSV, HSL, HSB).

The image plane or an image in the image plane of the area scan camera may therefore be analyzed in terms of hue, brightness and/or saturation using the processing device. The image information may be used in particular to analyze the material type and the distribution, as different materials have different H, S and V values. A color space may be selected as a function of the materials to be analyzed: an RGB color space may serve as the basis.

The processing device may be used to determine a material, a material property and/or a geometric structure of the product from the analysis image and/or to compare the analysis image with a reference image. Further material structure information of a product may be obtained if line images of the analysis image are superimposed and evaluated using the processing device. For example, two line images of a matching product surface may be combined using the image processing of the processing device. Optionally, sequential illumination by means of the spectrometer member may also take place. In this case, a first analysis image is first recorded with illumination in a single wavelength range, and then a second analysis image is captured with illumination in a single different wavelength range of a matching product surface. Finally, the analysis images are combined using image processing. The processing device may further be used to compare analysis image information or analysis images with reference images as part of a defect analysis. The reference images of the product may include CAD data and material distribution data of the product. The comparison may be carried out by image processing, wherein difference images may be analyzed separately for different structures of the product. Furthermore, this material information may be combined with height information in order to clearly identify a conductor track, for example. The reference image information may therefore include all geometric data of the product, material information, component information and also height information. If the analysis image information deviates from the reference image information, a defect may be signaled.

In this way, at least two or more line images of a matching product surface can be combined using the image processing of the processing device. This may result in what is referred to as an HDR (high dynamic range) image. A graduated series of exposures may be achieved by adjusting the illumination using the spectrometer member and/or a correspondingly different detection of the sensor lines of the area scan camera using the processing device. For example, a 12-bit analysis image of the area scan camera in which several brightnesses are integrated in 8-bit format may be read out by means of the processing device. Overall, a color location of a color space of a pixel of the analysis image in question may thus be determined even more precisely.

Further advantageous embodiments of the method are apparent from the descriptions of features of the claims dependent on the device claim.

Hereinafter, a preferred embodiment of the invention is explained in more detail with reference to the attached FIGURE. The FIGURE shows a simplified principle represen-tation of an embodiment of an inspection system 26 in a side view. The inspection system 26 has an area scan camera 27. Furthermore, a detection device 28 having a detection unit 29 comprising the area scan camera 27, an objective 30 and a dispersive element 31 is shown together with a projection device 32. The projection device 32 has a light source 33, which emits white light, a diaphragm 34 and a further dispersive element 35. The further dispersive element 35 is formed by a further prism 36, by means of which a multichromatic light beam 37 is projected onto a product surface 38 of a product (not shown) transversely to a direction of movement indicated by an arrow 39.

The objective 30 comprises a lens assembly 40, which is shown schematically here, a front lens 41 and a diaphragm 42 disposed on the image side. The diaphragm 42 is configured in particular as a slit diaphragm 43. The front lens 41 is in the shape of a circle segment and has two parallel boundary surfaces 45 coaxial with an optical axis 44. The optical axis 44 runs through a detection plane 46 of the detection unit 29, the detection plane 46 being orthogonal to the product surface 38, which corresponds to an object plane 47. The multichromatic light beam 37 strikes the product surface 38 or the object plane 47 at an angle β relative to the detection plane 46 and is reflected from there into the objective 30. The dispersive element 31, which is formed by a prism 48, is disposed between the objective 30 and the area scan camera 27. The prism 48 disperses the light emerging from the objective 30 and projects it onto the area scan camera 27 or its image plane 49. Furthermore, a correction device (not shown) is provided in this case, the correction device correcting a longitudinal chromatic aberration of the reflected multichromatic light beam in the image plane 49. The correction device may be formed by the mere fact that the image plane 49 is pivoted, i.e., not parallel, relative to a main plane 50 of the objective 30. So an angle Y≠0 is formed between the image plane 49 and the main plane 50. The inclination of the image plane 49 is selected in such a manner that, regardless of the wavelength of the light dispersed by the prism 48, said light is imaged with sufficient sharpness in the image plane 49. Alternatively or additionally, a further optical element (not shown) which corrects the longitudinal chromatic aberration accordingly may be disposed on the optical axis 44 between the objective 30 and the image plane 49.

A processing device (not shown) derives height information of the product surface 38 relative to the area scan camera 27 based on a spatial distribution of the reflected multichromatic light beam 37 on the area scan camera 27. For this purpose, sensor lines (not shown) of the area scan camera 27 which run parallel to the detection plane 46 are evaluated, five sensor lines with the highest or maximum saturation values being detected. The height information may then be calculated from a position of the sensor lines relative to the detection plane 46 and the angle of incidence β. This height information is always consistently accurate regardless of the height of the product surface 38, as the accuracy is independent of a wavelength of the light projected onto the detection plane 46 due to the use of the correction device. Furthermore, the processing device is used to superimpose the sensor lines or their line images. These line images are in turn combined to form an analysis image of the product.

The invention claimed is:

1. An inspection system (26) for analyzing defects in a product, in particular a printed circuit board product, a semiconductor wafer or the like, the inspection system comprising a projection device (32), an optical detection device (28) and a processing device, the projection device having at least one spectrometer member configured to split white light into its spectral components and project a multichromatic light beam (37) thus formed from monochromatic light beams onto a product at an angle of incidence β, the optical detection device having a detection unit (29) comprising an area scan camera (27) and an objective (30), the area scan camera being configured to detect the multichromatic light beam (37) reflected on the product in a detection plane (46) of the detection unit, the detection plane (46) being perpendicular, preferably orthogonal, to a product surface (38) of the product,
wherein the detection unit has a dispersive or diffractive element (31) configured to project the reflected multichromatic light beam onto an image plane (49) of the area scan camera, the processing device being configured to derive a height information of the product surface from a spatial distribution of saturation values of the reflected multichromatic light beam in the image plane, a position of the optical detection unit relative to the product and the angle of incidence β, the detection unit having a correction device, the correction device being configured to correct a longitudinal chromatic aberration of the reflected multichromatic light beam in the image plane.

2. The inspection system according to claim 1, wherein the processing device is configured to capture line images from at least two sensor lines of the area scan camera (27) that have above-average saturation values.

3. The inspection system according to claim 1, wherein the correction device is formed by a further optical element disposed in the beam path between the objective (30) and the area scan camera (27).

4. The inspection system according to claim 1, wherein the processing device is configured to derive an analysis image of the product from a plurality of line images.

5. The inspection system according to claim 1, wherein the objective (30) is configured to project a line image from an object plane (47) of the product surface (38) onto the image plane (49) of the area scan camera (27), the area scan camera being disposed perpendicularly to a direction of movement (39) of a product.

6. The inspection system according to claim 1, wherein the area scan camera (27) is formed by a RGB chip or a grayscale chip having 32 to 128 sensor lines; perpendicular to a direction of movement (39) of a product.

7. The inspection system according to claim 1, wherein the projection device (32) is configured to emit light of the wavelength ranges red, green, blue (RGB), infrared (IR) and/or ultraviolet (UV), and the area scan camera (27) is configured to detect said light.

8. The inspection system according to claim 1, wherein the dispersive or diffractive element (31) is a prism (48) or a diffraction grating.

9. The inspection system according to claim 1, wherein the objective (30) is a telecentric objective having a diaphragm (42) on the image side.

10. The inspection system according to claim 9, wherein the diaphragm (42) is a slit diaphragm.

11. The inspection system according to claim 1, wherein the objective (30) has a front lens (41) which is formed by one or more of a converging lens and an achromatic lens, the front lens being a cylindrical or spherical lens.

12. The inspection system according to claim 11, wherein the front lens (41) has a shape of a circle segment with two coaxial and parallel boundary surfaces (45).

13. A method for analyzing defects in a product, in particular a printed circuit board product, a semiconductor wafer or the like, the method using an inspection system (26), the inspection system comprising a projection device (32), an optical detection device (28) and a processing device, a spectrometer member of the projection device splitting white light into its spectral components and projecting a multichromatic light beam (37) thus formed from monochromatic light beams onto a product at an angle of incidence β, the optical detection device having a detection unit (29) comprising an area scan camera (27) and an objective (28), a multichromatic light beam (37) being reflected on the product in a detection plane (46) of the detection unit, the detection plane being perpendicular, preferably orthogonal, to a product surface of the product, the area scan camera detecting said multichromatic light beam,
wherein a dispersive or diffractive element (31) of the detection unit projects the reflected multichromatic light beam onto an image plane (49) of the area scan camera, the processing device deriving a height information of the product surface from a spatial distribution of saturation values of the reflected multichromatic light beam in the image plane, a position of the optical detection unit relative to the product and the angle of incidence $\beta$, a correction device of the detection unit correcting a longitudinal chromatic aberration of the reflected multichromatic light beam in the image plane.

14. The method according to claim 13, wherein the processing device simultaneously detects line images from at least three, preferably five, sensor lines of the area scan camera (27) that have the highest saturation values.

15. The method according to claim 13, wherein line images in the wavelength ranges red, green, blue (RGB) are detected simultaneously.

16. The method according to claim 13, wherein the processing device analyses the image plane (49) of the area scan camera (27) for hue, brightness and/or saturation.

17. The method according to claim 13, wherein the processing device determines at least one of a material, a material property and a geometric structure of the product from the analysis image and/or compares the analysis image to a reference image.

18. The method according to claim 13, wherein the processing device combines at least two or more line images of a matching product surface (38) by image processing.

19. The inspection system according to claim 6, wherein the area scan camera (27) is formed by a RGB chip or a grayscale chip having 32 to 64 sensor lines perpendicular to a direction of movement (39) of a product.

* * * * *